(12) United States Patent
Singh et al.

(10) Patent No.: US 11,535,522 B2
(45) Date of Patent: Dec. 27, 2022

(54) INORGANIC MATERIAL COMPOSITION AND UTILITIES THEREOF

(71) Applicant: Imerys USA, Inc., Roswell, GA (US)

(72) Inventors: Virendra Singh, Decatur, GA (US); Christopher Paynter, Atlanta, GA (US); David Gittins, Truro (GB); Dickey Shurling, Sandersville, GA (US); Douglas Wicks, Johns Creek, GA (US); Janet Preston, St Austell (GB); Andrew Findlay, Truro (GB)

(73) Assignee: Imerys USA, Inc., Roswell, GA (US)

( * ) Notice: Subject to any disclaimer, the term of this patent is extended or adjusted under 35 U.S.C. 154(b) by 0 days.

(21) Appl. No.: 17/117,041

(22) Filed: Dec. 9, 2020

(65) Prior Publication Data

US 2021/0101802 A1    Apr. 8, 2021

Related U.S. Application Data

(63) Continuation of application No. 16/095,467, filed as application No. PCT/US2017/028788 on Apr. 21, 2017, now Pat. No. 10,875,782.

(60) Provisional application No. 62/336,379, filed on May 13, 2016, provisional application No. 62/326,195, filed on Apr. 22, 2016.

(51) Int. Cl.
| | |
|---|---|
| *C09D 5/00* | (2006.01) |
| *C01F 11/18* | (2006.01) |
| *C09D 11/033* | (2014.01) |
| *C09D 11/037* | (2014.01) |
| *C09D 11/08* | (2006.01) |
| *C09D 11/105* | (2014.01) |
| *D21H 19/38* | (2006.01) |
| *D21H 21/52* | (2006.01) |
| *D21H 19/36* | (2006.01) |
| *C08K 3/26* | (2006.01) |

(52) U.S. Cl.
CPC .............. *C01F 11/185* (2013.01); *C09D 5/00* (2013.01); *C09D 11/033* (2013.01); *C09D 11/037* (2013.01); *C09D 11/08* (2013.01); *C09D 11/105* (2013.01); *D21H 19/36* (2013.01); *D21H 19/38* (2013.01); *D21H 21/52* (2013.01); *C01P 2004/61* (2013.01); *C01P 2006/12* (2013.01); *C08K 3/26* (2013.01)

(58) Field of Classification Search
CPC ....... C01F 11/185; C09D 5/00; C09D 11/033; C09D 11/037; C09D 11/08; C09D 11/105; C09C 1/021; C09C 1/028; C09C 1/40; C09C 1/405; C09C 1/42; C09C 1/02; D21H 19/36; D21H 19/38; D21H 21/52; C01P 2004/61; C01P 2006/12; C08K 3/26

USPC ........................................................ 523/210
See application file for complete search history.

(56) References Cited

U.S. PATENT DOCUMENTS

| | | | |
|---|---|---|---|
| 4,244,933 A | 1/1981 | Shibazaki et al. | |
| 4,250,289 A | 2/1981 | Denzinger et al. | |
| 4,867,972 A | 9/1989 | Girardeau et al. | |
| 6,569,527 B1 | 5/2003 | Calhoun et al. | |
| 6,620,421 B1 | 9/2003 | Nishi et al. | |
| 7,875,689 B2 | 1/2011 | Ikuno et al. | |
| 9,441,118 B2 | 9/2016 | Bhargava et al. | |
| 9,631,492 B2 | 4/2017 | Anstine et al. | |
| 10,533,417 B2 | 1/2020 | Wicks et al. | |
| 2008/0196621 A1 | 8/2008 | Ikuno et al. | |
| 2008/0287554 A1 | 11/2008 | Gittins et al. | |
| 2013/0253129 A1* | 9/2013 | Sixt ..................... | C08L 83/04 524/588 |
| 2014/0007791 A1 | 1/2014 | Bhargava et al. | |
| 2015/0030869 A1* | 1/2015 | Preston ................ | C08L 21/02 524/425 |
| 2015/0152282 A1* | 6/2015 | Wang ................... | C09D 131/04 524/521 |

FOREIGN PATENT DOCUMENTS

| | | |
|---|---|---|
| JP | S54132499 A | 10/1979 |
| JP | S5540797 A | 3/1980 |
| JP | S5814366 B2 | 3/1983 |
| JP | S621449 A | 2/1992 |
| JP | 2000-169142 A | 6/2000 |

(Continued)

OTHER PUBLICATIONS

International Search Report and Written Opinion dated Aug. 24, 2017, in International Application No. PCT/US2017/028788 (12 pgs.).

*Primary Examiner* — Hannah J Pak
(74) *Attorney, Agent, or Firm* — Finnegan, Henderson, Farabow, Garrett & Dunner, LLP

(57) ABSTRACT

Inorganic particulate compositions containing inorganic particles associated with a copolymer of a hydrophilic monomer and a hydrophobic monomer associated with the inorganic particles are provided. The particulate composition satisfies at least one of the following properties:
  a BET surface area of the inorganic particles is greater than 8 m²/g,
  a Hegman value of the inorganic particles is 75 microns or less, and
  a rate of water loss from the composition upon drying from a moisture level greater than 2% wt % is at least 30% greater than a composition having a corresponding content of a polyacrylate polymer associated with the particles. A method to prepare the composition and formulations for inks, paints, coatings and filled polymeric articles containing the inorganic particulate composition are also provided.

6 Claims, 2 Drawing Sheets

(56) References Cited

FOREIGN PATENT DOCUMENTS

| JP | 2008-200899 A | 9/2008 |
| JP | 2001-172103 A | 3/2011 |
| JP | 2015-522095 A | 8/2015 |

* cited by examiner

INORGANIC MATERIAL COMPOSITION AND UTILITIES THEREOF

CLAIM FOR PRIORITY

This application is a continuation of U.S. application Ser. No. 16/095,467, filed Oct. 22, 2018, which is a 371 application of PCT/US17/28788, filed Apr. 21, 2017, which claims the benefit of priority of U.S. Provisional Application Nos. 62/326,195, filed Apr. 22, 2016, and 62/336,379, filed May 13, 2016, all of which are incorporated herein by reference in their entirety.

FIELD

This disclosure relates to inorganic material compositions having useful properties as fillers for polymers, resins, inks, papers, boards, packaging, paints and coating compositions, methods to manufacture the compositions and compositions containing the inorganic material compositions.

DESCRIPTION OF THE RELATED ART

Inorganic particulate compositions are used widely for the production of pigment or filler containing compositions which may be used, for example, in paper manufacture or paper coating, the production of filled compositions for paints, inks and plastics and the production of porous or permeable films. Inorganic materials which have employed in such utilities include mineral metal oxides, metal hydroxides, metal alkoxides, metal silicates, metal bicarbonates and metal carbonates, wherein the metal may be an alkali metal, an alkaline earth metal, aluminum and selected transition metals. Due to availability and low cost, alkaline earth metal carbonates (AEMC) are often a preferred inorganic material of use in the above listed utilities. Throughout the following disclosure, discussion of treatment and utilities of AEMC materials is understood to also be applicable to other inorganic materials, such as those listed above. To this end, the terms inorganic material, mineral, metal carbonate and alkaline earth metal carbonate may be used interchangeably unless explicitly defined in a particular embodiment.

To be suitable for a given utility, the mineral material is typically comminuted, milled or ground and often dispersed to a target particle size and particle size distribution corresponding to the intended end use. Generally, the required particle size is obtained by grinding the inorganic material either in an aqueous suspension or by means of a dry milling system. In either case, it may be advantageous to add chemical agents during the milling operation to assist the comminution process. Such grinding aids may additionally function as dispersants and may advantageously affect the energy and time required to achieve a target particle size and distribution. In addition, comminuted particle morphology, degree of agglomeration, surface chemistry and bulk density of the dried product composition may be modified by the chemistry and structure of the grinding aid/dispersant. All these properties are important with regard to the manufacturing efficiency, cost and performance of the particulate in an intended end-use.

Where the inorganic material is comminuted in an aqueous suspension at high solids content, it is necessary to disperse the comminuted material using an effective amount of a dispersing or deflocculating agent (dispersant). High solids grinding typically produces a relatively high proportion of ultra-fine particles (e.g. having an equivalent spherical diameter smaller than about 0.25 μm). To maintain an acceptably low viscosity of the suspension, it may be necessary to employ relatively high levels of common dispersants, or lower levels of specialized—and thus relatively expensive—dispersants.

It is often necessary to produce a material having a particle size distribution which has a large proportion of the particles within a narrow size range. To this end, it is conventional practice to grind the aqueous suspension at a low solids content in order to minimize the formation of ultra-fine particles. It may also be desirable to perform the grinding stage in the presence of a dispersant in order to maintain a flocculated or aggregated state and so facilitate subsequent flocculated dewatering. In some cases, effective amounts of specialized dispersants are added to the dewatered, relatively high-solids suspension to minimize flocculation and provide an acceptable viscosity for handling at that stage. It is also common practice to recirculate the water removed at the dewatering stage, to dilute the fresh feed. However, a number of problems can arise. For example, there can a significant loss in brightness (discoloration) due to corrosion products (e.g. iron-based corrosion products) from the system piping and equipment. Typically brightness values can be reduced by about 2-3 ISO units lower, with yellowness values about 1-2 ISO units higher. This discoloration is probably exacerbated in the low solids method, because the recirculated water becomes relatively highly aerated.

Dispersants are generally water-soluble salts capable of supplying anionic species, which in their effective amounts may adsorb on the surface of the alkaline earth metal carbonate particles and thereby inhibit aggregation of the particles. The unsolvated salts may include alkali, metal cations, such as sodium. Examples of suitable dispersants also include water soluble condensed phosphates, for example, polymetaphosphate salts (general form of the sodium salts: $(NaPO_3)_x$), such as tetrasodium metaphosphate or so-called "sodium hexametaphosphate" (Graham's salt); water-soluble salts of polysilicic acids; polyelectrolytes; salts of homopolymers or copolymers of acrylic acid or methacrylic acid; or salts of polymers of other derivatives of acrylic acid, suitably having a weight average molecular mass of less than about 20,000.

As described above, conventional commercially available grinding aid/dispersant materials are generally either highly charged ionic species or nonionic hydrophilic materials. Such materials have little potential for adjustment of a hydrophilic/hydrophobic balance in order to manipulate both grinding and dispersion performance and surface modification of the inorganic particulate material. Additionally, especially when highly hydrophilic ionic agents such as the polyacrylic acids, are employed in wet grinding, the resulting aqueous particulate dispersions are generally stable and may be useful as fillers and coatings for the paper industry. However, such aqueous dispersions are difficult to dry and require high-energy-use drying devices to obtain a dried particulate material. Moreover, the dried products tend to assume a high equilibrium moisture level which may adversely affect compatibility and performance in end uses such as filled polymers, non-aqueous inks and paints. Further, in water based systems such as latex paints and paper coatings, fillers with high moisture retention may adversely affect the drying properties of the paint or coating.

Thus there is a need for grinding/dispersing agents that can be structurally and chemically constructed to optimize grinding performance both in wet and dry systems while also providing unique and adjustable physical and chemical properties to an inorganic particulate, such as, for example, an AEMC.

Additionally, there is a need for improved methods of comminution of inorganic materials which are cost effective, energy efficient and capable to be conducted in conventional milling equipment.

Further, there is a need for unique and novel inorganic particulate compositions, such as AEMC compositions, having chemical and physical properties combined with low moisture absorption and/or low equilibrium moisture content which provide improved compatibility/and end use performance in functional utilities including coating compositions, filled polymers and paper products, inks and paints.

One embodiment consistent with the present disclosure includes a particulate composition, comprising:

particles of an inorganic material; and a copolymer of a hydrophilic monomer and a hydrophobic monomer associated with the inorganic particles;

wherein the particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In one aspect of the first embodiment, a moisture pick-up of the particulate composition is 1.0 wt % or less when exposed to 98% relative humidity for 24 hours at 23° C.

In another aspect of the first embodiment, a BET surface area of the inorganic particles may be less than 8 $m^2/g$, such as, for example, between 2.5 $m^2/g$ and 6 $m^2/g$.

In another embodiment, a method to manufacture an inorganic particulate material composition is provided. The method comprises adding an effective amount of a copolymer of a hydrophilic monomer and a hydrophobic monomer to the inorganic material to obtain a mixture; and grinding the inorganic material copolymer mixture to obtain a ground particulate material;

wherein the particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In another aspect of this embodiment, a BET surface area of the inorganic particles may be less than 8 $m^2/g$, such as, for example, between 2.5 $m^2/g$ and 6 $m^2/g$.

In further embodiments the present application provides utilities including a filled polymeric article, a coating composition, a microporous polymer film, a paint and an ink composition containing a particulate composition, comprising:

particles of an inorganic material; and a copolymer of a hydrophilic monomer and a hydrophobic monomer associated h the inorganic particles;

wherein the particulate composition satisfies at least one of the following properties:

a BET surface area of the inorganic particles is greater than 8 $m^2/g$,

Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In further aspects of each of these embodiments, a mole ratio of the hydrophobic monomer to the hydrophilic monomer may be from 10/1 to 1/1 and a moisture pick-up of the particulate composition may be 1.0 wt % or less when exposed to 98% relative humidity for 24 hours at 23° C.

In further aspect of the embodiments, a BET surface area of the inorganic particles may be less than 8 $m^2/g$, such as, for example, between 2.5 $m^2/g$ and 6 $m^2/g$.

In the following description, certain aspects and embodiments will become evident. It should be understood that the aspects and embodiments, in their broadest sense, could be practiced without having one or more features of these aspects or embodiments. It should be understood that these aspects and embodiments are merely exemplary.

DETAILED DESCRIPTION

Figure 1:
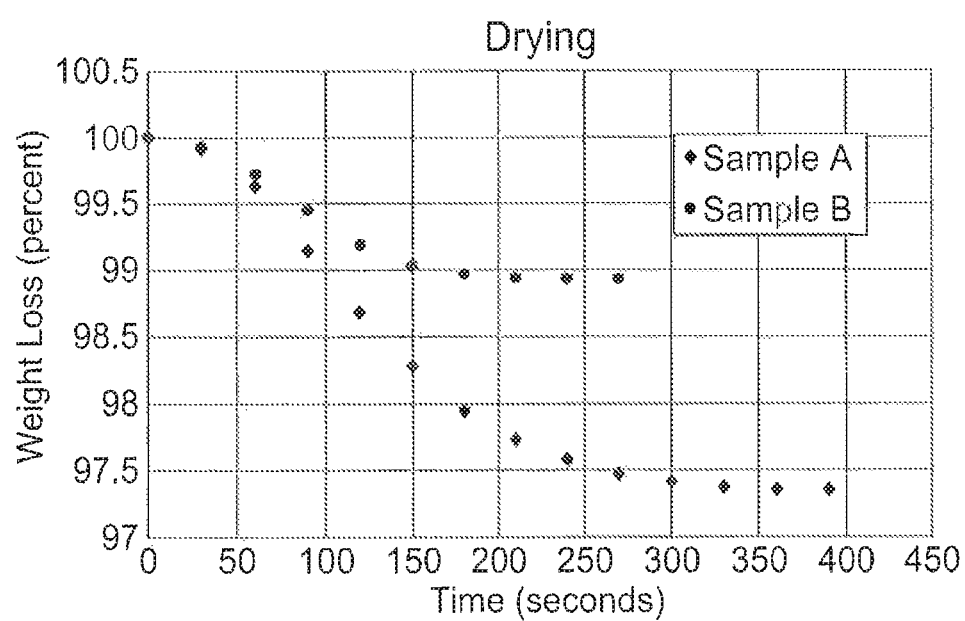
FIG. 1 shows a graph of moisture loss with time for an inorganic particulate material according to one embodiment of the invention (Sample B) in comparison to a conventional particulate material (Sample A).

Throughout this description all ranges described include all values and sub-ranges therein, unless otherwise specified. Thus, for example when a range is described as from 5 to 10, all values including 5, 6, 7, 8, 9 and 10 are included and all subranges such as for example, 6 to 10, 6 to 9 and 7 to 10 are also included. Additionally, the indefinite article "a" or "an" carries the meaning of "one or more" throughout the description, unless otherwise specified.

The inventors have unexpectedly and surprisingly discovered that mineral material particulates treated with copolymers of defined molecular weight containing hydrophobic and hydrophilic comonomers in a specified mole ratio may have novel properties which render them particularly suitable as fillers for polymer compositions, papers, boards, inks, coatings and paints. The properties of these inorganic particulates may include one or more of a BET surface area of the inorganic particles being greater than 8 $m^2/g$, a Hegman value of the inorganic particles being 75 microns or less, and a rate of water loss upon drying from a moisture level greater than 2% wt % being at least 30% greater than a composition having a corresponding content of a polyacrylate polymer associated with the particles. Moreover, by selection of the hydrophobic monomer/hydrophilic monomer ratio of the copolymer associated with the inorganic particulate material, the compatibility of the particulate material with a selected polymer, resin or binder may be optimized. Such improved compatibility may be especially useful to facilitate the incorporation of the filler into polymer articles, sealant compositions and coating compositions.

Without being bound by theory, the inventors believe that the copolymer in association with the inorganic particulate material may chemically and/or physically be bonded to the particle surface and form at least a partial coating of the surface. The surface character of the particle may thus be modified to greater or lesser degree of hydrophobicity according to the mole ratio and structure of the monomer units of the copolymer and thus the compatibility of the filler with a polymer, resin or binder optimized to enhance incorporation and performance in drying time and subsequent moisture absorption. The particle may have properties similar to conventional stearate-treated inorganic particulate materials, even if prepared without that process step.

Additionally, in certain applications the functionality of the mineral particle surface may be modified to provide specific benefit. For example, a filler for paper may be prepared wherein the functionality of the filler surface is made sufficiently hydrophobic such that hydrophobic contaminants such as pitch or rosin esters present in the aqueous environment may be captured on the particle surface and effectively removed from the grey water which is recycled. The mineral particle surface may be, for example, tailored to balance hydrophobic and hydrophilic properties Further, a filler having optimized compatibility and improved incorporation in inks, including offset inks containing polymeric or natural resins or rosin-ester resins may be obtained.

Thus according to some embodiments a particulate composition, comprising: particles of an inorganic material; and a copolymer of a hydrophilic monomer and a hydrophobic monomer associated with the inorganic particles is provided. The composition of these embodiments satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2 wt % is at least 30% greater than a composition having a corresponding content of a polyacrylate polymer associated with the particles.

Thus In further aspects, the BET surface area may be greater than 9 $m^2/g$, greater than 10 $m^2/g$ and may be in a range of from 8 to 20 $m^2/g$, 9 to 18 $m^2/g$ or 10 to 15 $m^2/g$. The BET surface area may also be below 8 $m^2/g$, such as in a range from 2.5 to 6 $m^2/g$.

In further aspects, the Hegman number may be 70 microns or less or 60 microns or less and may be in a range from 25 to 75 microns, 30 to 70 microns or 35 to 60 microns.

The Hegman number for a dispersion or paste is the depth of grove in the Hegman Gauge at which dicrete particles or agglomerates become visible when the dispersion or paste is scrapped along the groove with a straight edge.

In further aspects, the rate of water loss from a moisture level greater than 2 wt % may be at least 40% greater, at least 50% or at least 60% greater than a composition having a corresponding content of a polyacrylate polymer associated with the particles.

The copolymer content of the composition may be from 0.01 to 22 mass % relative to the mass of the inorganic material. In certain aspects the copolymer content may be from 3 to 20 mass %, from 4 to 18 mass % or from 5 to 15 mass % relative to the mass of the inorganic material.

In one aspect of these embodiments, the mole ratio of the hydrophobic monomer to the hydrophilic monomer may be from 10/1 to 1/1. In further aspects the mole ratio of the hydrophobic monomer to the hydrophilic monomer may be from 8/1 to 1/1 or 5/1 to 1/1.

The hydrophobic monomer may contain at least one side chain having from 3 to 10 carbons. Exemplary hydrophobic monomers may include but are not limited to (meth)acrylate esters, alkenes, vinyl esters, vinyl ethers, styrene, alkyl substituted styrenes, vinyl pyrroles, terpene, indenes and an alkyl substituted (meth)acrylamides. According to the description herein the term side chain denotes a chain extending from a polymeric backbone when the monomer is polymerized. Each of these monomers may be substituted in the hydrophobic side chain with one or more groups selected from fluoro, chloro, bromo, iodo, $C_{1-6}$ alkoxy, cyano and nitro.

In certain embodiments, a combination of monomers may be copolymerized to give tailored properties to the inorganic particulate composition. For example, in one aspect a combination of monomers such as diisobutylene/styrene, diisobutylene/vinyl pyrrole, 1-octene/styrene and 1-octene/vinyl pyrrole may be copolymerized to provide dual hydrophobic functionality. In these examples, dual functionality of aliphatic/aromatic groups is described. Further, within the gist of the embodiments, one of skill in the art may readily combine other monomers from the list described above to obtain copolymers having highly specific designed properties.

According to certain embodiments the hydrophobic monomer may be an alkene selected from the group consisting of 1-pentene, 1-Hexene, 1-heptene, 1-octene, isobutylene and di-isobutylene.

The hydrophilic monomer may be any of monomers containing a functionality selected from the group consisting or carboxylate, carboxylic acid anhydride, sulfonate and phosphonate.

Without wishing to be bound by theory, the inventors believe these groups may bond chemically or physically with polar functionalities on the surface of the inorganic particulate and may serve as the basis for the association between the copolymer and the particulate material. In specific aspects, the hydrophilic monomer may contain a carboxylate group or a carboxylic acid anhydride. These groups may be effective to associate especially to AEMC particulates.

Examples of hydrophilic monomers having carboxylate or carboxylic acid anhydride groups may include, but are not limited to, acrylic acid, methacrylic acid, angelic acid, itaconic acid, crotonic acid, isocrotonic acid, fumaric acid, maleic acid, maleic anhydride, glutaconic acid, glutaconic anhydride, aconitic acid and mesaconic acid.

According to certain embodiments, the hydrophilic monomers may be a salt form or a mixed salt free acid form. In an aspect of these embodiments from 30 to 100% of the carboxyl groups of the hydrophobic monomer/hydrophilic monomer copolymer may be in a salt form. In further aspects from 40 to 100%, 50 to 100% or 60 to 100% of the carboxyl groups of the hydrophobic monomer/hydrophilic, monomer copolymer may be in a salt form.

In a further aspect, a counterion of the carboxylate group of the salt form may be at least one of sodium, ammonium and magnesium. In other aspects, in order to obtain other properties as known to one of skill in the art, counterions different from sodium, ammonium and magnesium may be employed.

In some embodiments, the copolymer may be a nonionic phosphate ester. This may include, for example, phosphate ester of polyethylene oxide (PEO)/polyethylene glycol (PEG), alkyl functionalized polyethylene glycol, or phosphate ester of a tri-block copolymer (EO-PO-EO). Grinding the inorganic particulate in the presence of a nonionic dispersant may lower the soluble salts in the particulate composition after manufacture, which may provide advantages in some applications. Lower levels of soluble salts may be desirable, for example, in paints, coatings, adhesives, sealants, and rubbers (including styrene butadiene rubber (SBR) and nitrile rubber (NBR)).

As indicated above the mole ratio of the hydrophobic monomer to the hydrophilic monomer may be from 10/1 to 1/1. In view of the above discussion, as the mole ratio is increased and approaches 10/1, the hydrophobic property of the inorganic particulate composition may be significantly increased. However, if the hydrophobic/hydrophilic ratio is increased above 10/1, the bonding associative effect of the hydrophilic monomer may be insufficient. The actual ratio of the comonomer employed may be determined by evaluation of properties of the inorganic particulate composition with regard to a specific end use.

According to certain embodiments the molecular weight of the hydrophobic monomer/hydrophilic monomer copolymer may be from 5,000 to 40,000 g/mol. In other embodiments the molecular weight of the hydrophobic monomer/hydrophilic monomer copolymer may be from 6,000 to 30,000 g/mol, 7,000 to 25,000 g/mol or 8,000 to 12,000 g/mol. In one aspect the average molecular weight of the hydrophobic monomer/hydrophilic monomer copolymer may be 10,000 g/mol. The molecular weight and polydispersity of the copolymer may be controlled by the method and parameters of polymerization as known to one of skill in the art.

The ranges and sub-ranges described above regarding the inorganic particulate material are applicable to all embodiments described herein unless explicitly specified differently.

According to some embodiments, the inorganic material may be an alkaline earth metal carbonate and in aspects of the embodiments the alkaline earth metal carbonate may be at least one selected from the group consisting of a carbonate of calcium, a carbonate of magnesium, a carbonate of barium and a carbonate of strontium.

In a further embodiment, wherein the inorganic material is an alkaline earth carbonate, the hydrophobic monomer/hydrophilic monomer copolymer may be a copolymer of diisobutylene and maleic anhydride. In an aspect of this embodiment the mole ratio of diisobutylene to maleic anhydride may be 1/1.

In some embodiments, the inorganic material may be, for example, a hydrous kaolinite clay, such as kaolin, halloysite or ball clay; an anhydrous kaolinite clay such as metakaolin or fully calcined kaolin; or another inorganic material such as talc, mica, perlite, bentonite, feldspar, wollastonite, diatomaceous earth, alumina, magnesium hydroxide, or aluminium trihydrate. Combinations of inorganic materials, with or without an alkaline earth metal carbonate, may also be used.

According to other embodiments, a method to manufacture the inorganic material composition, according to the above embodiments and aspects is provided. The method may include adding an effective amount of a copolymer of a hydrophilic monomer and a hydrophobic monomer to the inorganic material to obtain a mixture; and grinding the inorganic material copolymer mixture to obtain a ground particulate material wherein the particulate composition satisfies at least one of the following properties:

a BET surface area of the inorganic particles is greater than 8 $m^2/g$, a Hegman value of the inorganic particles is 75 Microns or less, and a rate of water loss from the composition upon drying from a moisture level greater than 2% wt % is at least 30% greater than a composition having a corresponding content of a polyacrylate polymer associated with the particles.

In certain aspects of this embodiment, the grinding method may be a wet grind wherein the milling is conducted in an aqueous medium. Grinding may occur without the presence of ionic grinding aids, such as, for example, the highly ionic polyacrylate salts used in conventional grinding methods.

The ground inorganic material may be prepared by attrition grinding. "Attrition grinding," as used herein, refers to a process of wearing down particle surfaces resulting from grinding and shearing stress between the moving grinding particles. Attrition can be accomplished by rubbing particles together under pressure, such as by a gas flow. In some embodiments, the attrition grinding may be performed autogenously, where the alkali earth metal carbonate particles are ground only by other alkali earth metal carbonate particles of the same type (e.g., calcium carbonate being ground only by calcium carbonate).

Alternatively, the ground inorganic material may be ground by the addition of a grinding media including ceramic particles (e.g., silica, alumina, zirconia, and aluminum silicate), plastic particles, or rubber particles.

The ground particulate may be further subjected to an air sifter or hydrocyclone. The air sifter or hydrocyclone can function to classify the ground particulate material and remove a portion of residual particles having a size outside the desired range.

Conventionally, in either wet milling or dry milling methods, a grinding aid or dispersant may be present in a sufficient amount to prevent or effectively restrict flocculation or agglomeration of the ground particles. The aid or dispersant may be present, for example, in levels up to about 1% by weight relative to the dry weight of the ground inorganic material. Examples of dispersants include polyelectrolytes such as polyacrylates and copolymers containing polyacrylate species, including polyacrylate salts (e.g., sodium and aluminum optionally with a Group II metal salt), sodium hexametaphosphates, polyols, polyphosphoric acid, condensed sodium phosphate, non-ionic surfactants, alkanolamines, and other reagents commonly used for this function.

The inventors have surprisingly discovered that hydrophobic monomer/hydrophilic monomer copolymer may be equally effective grinding aids to the conventional systems in terms of milling time and energy. According to certain embodiments, the inorganic mineral materials may be efficiently comminuted at high solids content such that mill capacity and throughput may be increased. Since high solids dispersions may be employed, less water must be removed during drying resulting in lower energy requirement and cost. Additionally, the copolymer of the described embodiments may be highly advantageous with respect to dewater and drying time. As described above, the rate of water loss at a typical drying temperature may be at least 30% greater according to the present embodiments, resulting in less energy consumption necessary for drying, greater plant throughput and increased production efficiency. The method of the present embodiment achieves these advantages employing conventional equipment and does not require capital expenditure to implement.

In another aspect of this embodiment, the grinding method may be conducted in a dry milling operation. In certain aspects of the dry grind embodiment, the milling may be conducted autogenously wherein particle attrition is obtained by collision of particles of like chemistry. In another aspect, a grinding media of greater hardness may be added to implement the particle size reduction. Such media may include ceramic particles such as silica, alumina, and zirconia. The technique of the method is known to one of skill in the art. The present aspect may include addition of the hydrophobic monomer/hydrophilic monomer copolymer according to previous embodiments to facilitate reduction of grinding time to obtain a target particle size range and distribution.

In consideration of either wet grinding or dry grinding, as described above, the mole ratio of the hydrophobic monomer to the hydrophilic monomer, the selection of monomer and monomer combinations and the molecular weight of the copolymer may be tailored to optimize performance and efficiency of the milling operation as previously described.

In each of the above described grinding operations, the hydrophobic monomer/hydrophilic monomer copolymer may be intimately associated with the particular inorganic material as described above. In other embodiments, the association may be obtained by dispersing a ground inorganic particulate material with the hydrophobic monomer/hydrophilic monomer copolymer in an aqueous medium.

Particle sizes, and other particle size properties, of the inorganic particulate material may be measured using a SEDIGRAPH 5100 instrument, as supplied by Micromeritics Corporation. The size of a given particle is expressed in terms of the diameter of a sphere of equivalent diameter, which sediments through the suspension, i.e., an equivalent spherical diameter or esd.

According to some embodiments, the inorganic particles may be characterized by a mean particle size ($d_{50}$) value, defined as the size at which 50 percent of the particles have a diameter less than or equal to the stated value. In some embodiments, the inorganic particles may have a $d_{50}$ in the range from about 0.1 micron to about 50 microns or from about 0.1 micron to about 20 microns or from about 0.5 microns to about 2 microns. The actual particle size and distribution may be obtained by control of grinding conditions and additives as recognized by one of skill in the art.

According to some aspects, the inorganic particles may be characterized by a top cut size ($d_{98}$) value, defined as the size at which 98 percent of the particles have a diameter less than or equal to the stated value. In some embodiments, the $d_{98}$ value may be in the range from about 2 microns to about 100 microns, or from about 5 microns to about 20 microns.

According to certain embodiments the inorganic material ground in the above method embodiments may be an alkaline earth metal carbonate which may be at least one selected from the group consisting of a carbonate of calcium, a carbonate of magnesium, a carbonate of barium and a carbonate of strontium.

According to extended embodiments of the above methods, the dried inorganic particulate material obtained as described above may be treated with a surface treatment agent to further tailor the surface properties of the inorganic particulate material. Thus a surface treatment may be applied to the particulate composition and the surface treatment agent may be at least one selected from the group consisting of caproic acid, 2-ethylhexanoic acid, caprylic acid, neodecanoic acid, capric acid, valeric acid, lauric acid, myristic acid, palmitic acid, stearic acid, behenic acid, lignoceric acid, tall oil fatty acid, napthenic acid, montanic acid, coronaric acid, linoleic acid, linolenic acid, 4,7,10,13,16,19-docosahexaenoic acid, 5,8,11,14,17-eicosapentaenoic acid, hexanoic acid, heptanoic acid, octanoic acid, nonanoic acid, and isononanoic acid.

In aspects of this embodiment, the weight % of the surface treatment agent may be from 0.005 to 5.0 mass % relative to the mass of the inorganic particulate composition. In further aspects the mass % of the surface treatment agent may be from 0.05 to 2.5 mass % or 0.1 to 1.0 mass % relative to the mass of the inorganic particulate composition.

In some aspects of this embodiment, the BET surface area may be less than 8 $m^2/g$, such as in a range from 2.5 to 6 $m^2/g$.

When such surface treatment is combined with the tailored properties obtained with the hydrophobic monomer/hydrophilic monomer copolymer fillers having highly specialized properties may be obtained.

In further embodiments, utility of the inorganic particulate compositions having the tailored and special properties obtained by the embodiments previously described may be included.

In one utility embodiment, a filled polymeric article, comprising: a polymer; and a filler of a particulate composition comprising: particles of an inorganic material; and a copolymer of a hydrophilic monomer and a hydrophobic monomer associated with the inorganic particles is provided. According to this embodiment, the particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In an aspect of this embodiment, a moisture pick-up of the particulate composition is 1.0 wt % or less when exposed to 98% relative humidity for 24 hours at 23° C. This property as well as those listed above may be tailored as previously described to obtain improved performance in a selected filled polymer article. Additionally, compatibility of the filler with a polymer matrix may be significantly improved by selection of the hydrophobic monomer based on the polymer structure. For example, in systems containing polyester polymers or resins, hydrophobic monomers based on (meth) acrylate esters and/or vinyl esters would provide enhanced compatibility. In contrast, in systems containing polyolefins, hydrophobic monomers selected from 1-pentene, 1-hexene, 1-heptene, 1-octene, isobutylene and di-isobutylene would provide enhanced compatibility. In the same manner, a copolymer based on an alkyl substituted (meth)acrylamide would be selected for use in a polyamide.

Further modification of hydrophobic monomer/hydrophilic monomer ratio, molecular weight, particle size and distribution and surface treatment may be conducted to obtain significant improvement in compatibility with a selected polymer and performance associated with the intended end use of the article as previously described.

According to aspects of the filled polymeric article embodiment, the polymer may be selected from the group consisting of a thermoplastic polymer, an isotropic semi-crystalline polymer, a semi-crystalline polymer, an isotropic polymer and a liquid crystal polymer. Examples of polymers useful for utility as filled articles include polyolefins such as polyethylene and polypropylene, polyvinyl chloride, chlorinated polyvinyl chloride ethylene-vinyl acetate (EVA), chlorinated polyethylene (CPE), polystyrene, acrylonitrile butadiene styrene (ABS), methacrylate butadiene styrene (MBS), Acrylonitrile butadiene rubber (NBR), thermoplastic polyurethane (TPU), Thermoplastic polyester elastomers (EPEE), and acrylic resins. This listing is exemplary only and is not intended to be limiting.

To obtain the filled polymeric article the molten filled polymer may be extruded through, for example, at least one spinneret to produce long filaments. Extrusion of the filled polymer from the spinnerets may be used to create, for example, a non-woven fabric. According to some aspects, the molten filled polymer may be extruded through a nozzle or dye to form polymeric articles, such as, for example, pipes, rods, honey-comb structures, or other articles having variously-shaped cross-sections. In another aspect, a polymeric film may be formed from the molten, filled polymer. For example, melt compounding may also be used to extrude films, tubes, shapes, strips, and coatings onto other materials, injection molding, blow molding, or casting, and thermoforming and formation of tubes or pipes. The melt compounding may, for example, be carried out in, for example, a suitable compounder or screw extruder.

According to some aspects, the filled polymer article may include a monofilament fiber. A monofilament fiber may include the production of a continuous monofilament fiber of at least one polymeric resin and at least one filler. Exemplary techniques include, but are not limited to, melt spinning, dry spinning, wet spinning, spin bonding, injection molding or melt blowing processes. Melt spinning may include an extrusion process to provide molten polymer mixtures to spinneret dies. According to some embodiments, monofilament fibers may be produced by heating the filled polymeric resin to at least about its melting point as it passes through the spinneret dies.

According to aspects of this embodiment, the inorganic particulate material employed as tiller in the filled polymeric article may be at least one alkaline earth metal carbonate selected from the group consisting of a carbonate of calcium, a carbonate of magnesium, a carbonate of barium and a carbonate of strontium.

According to some embodiments, an aqueous coating composition is provided. The composition contains water; a binder; and a particulate composition, comprising: particles of an inorganic material; and a copolymer of a hydrophilic monomer and a hydrophobic monomer associated with the inorganic particles. The particulate composition satisfies at least one of the following properties;

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In a further aspect, a moisture pick-up of the particulate composition of the coating composition is 1.0 wt % or less when exposed to 98% relative humidity for 24 hours at 23° C.

As described in previous embodiments, the hydrophobic monomer/hydrophilic monomer ratio, molecular weight, particle size and distribution of the copolymer may be conducted to obtain significant improvement in compatibility with the binder and coating performance. Additionally, the inorganic particulate material may be surface treated to enhance performance properties.

According to aspects of this embodiment, the inorganic particulate material employed as filler in the filled polymeric article may be at least one alkaline earth metal carbonate selected from the group consisting of a carbonate of calcium, a carbonate of magnesium, a carbonate of barium and a carbonate of strontium.

In other embodiments, a surface coated substrate, coated with the coating composition described above is provided. The substrate may be one selected from the group consisting of paper, cardboard, containerboard, plastic, cellophane, textile, wood, glass, metal and concrete. This listing is exemplary and is not limiting.

In another embodiment, a method to prepare a porous polymer film is provided. The method may include preparing a composition of a thermoplastic polymer and an inorganic particulate composition; and molding a film with the composition; wherein the inorganic particulate composition comprises: particles of an inorganic material; and a copolymer of a hydrophilic monomer and a hydrophobic monomer associated with the inorganic particles. The particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In a further aspect, a moisture pick-up of the particulate composition is 1.0 wt % or less when exposed to 98% relative humidity for 24 hours at 23° C.

According to aspects of this embodiment, the inorganic particulate material employed in this method may be at least one alkaline earth metal carbonate selected from the group consisting of a carbonate of calcium, a carbonate of magnesium, a carbonate of barium and a carbonate of strontium.

Further modification of hydrophobic monomer/hydrophilic monomer ratio, molecular weight, particle size and distribution and surface treatment may be conducted to obtain significant improvement in compatibility with a selected polymer and performance associated with the method.

According to another embodiment, a microporous film is provided. The film contains at least one of polyethylene and polypropylene; and an inorganic filler, comprising particles of an inorganic material; and a copolymer of a hydrophilic monomer and a hydrophobic monomer associated with the inorganic particles. The particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In an aspect of this embodiment, a moisture pick-up of the particulate composition 1.0 wt % or less when exposed to 98% relative humidity for 24 hours at 23° C.

According to aspects of this embodiment, the inorganic particulate material employed may be at least one alkaline earth metal carbonate selected from the group consisting of a carbonate of calcium, a carbonate of magnesium, a carbonate of barium and a carbonate of strontium.

In a further aspect, a microporous composite of a woven or non woven fabric and the microporous film described above is provided.

Further modification of hydrophobic monomer/hydrophilic monomer ratio, molecular weight, particle size and distribution and surface treatment may be conducted to obtain significant improvement in compatibility with a selected polymer and performance associated with the microporous film as previously described.

In another embodiment, an ink containing at least one of a polymeric resin or natural resin; a hydrocarbon solvent; optionally, an alkyd resin; and at least one of a colorant and a pigment; and an inorganic particulate composition is provided. The inorganic particulate composition contains particles of an inorganic material; and a copolymer of a hydrophilic monomer and a hydrophobic monomer associated with the inorganic particles. The particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In an aspect of this ink embodiment a moisture pick-up of the particulate composition is 1.0 wt % or less when exposed to 98% relative humidity for 24 hours at 23° C.

Further modification of hydrophobic monomer/hydrophilic monomer ratio, molecular weight, particle size and distribution and surface treatment may be conducted to obtain significant improvement in compatibility with the ink components and ink performance as previously described. As indicated previously the significant increase in moisture loss and low moisture uptake obtained with the inorganic particulate material described in the embodiments may provide significant benefit to ink drying and image durability. The opportunity to enhance such performance by modification of the inorganic particulate filler according to the embodiments described provides significant advantages to the ink formulation.

In another aspect, an offset ink composition is provided. According to this aspect the offset ink contains a rosin-ester resin; a vegetable drying oil; a hydrocarbon solvent; and a particulate composition. The particulate composition contains particles of an inorganic material; and a copolymer of a hydrophilic monomer and a hydrophobic monomer associated with the inorganic, particles. The particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt is at least 30% greater than a composition having a corresponding content of a polyacrylate polymer associated with the particles.

In a further aspect of this off-set ink embodiment a moisture pick-up of the particulate composition is 1.0 wt % or less when exposed to 98% relative humidity for 24 hours at 23° C.

As indicated for the ink embodiment above, further modification of hydrophobic monomer/hydrophilic monomer ratio, molecular weight, particle size and distribution and surface treatment may be conducted to obtain significant improvement in compatibility with the off-set ink components and ink performance as previously described. Again, the significant increase in moisture loss and low moisture uptake obtained with the inorganic particulate material described in the embodiments may provide significant benefit to ink drying and image durability. The opportunity to enhance such performance by modification of the inorganic particulate filler according to the embodiments described provides significant advantages to the ink formulation.

In further aspects of both of the above ink embodiments, the inorganic particulate material employed as filler in the ink or off-set ink may be at least one alkaline earth metal carbonate selected from the group consisting of a carbonate of calcium, a carbonate of magnesium, a carbonate of barium and a carbonate of strontium.

In other embodiments, a semi-gloss paint composition, containing an alkyd resin; mineral spirits; a pigment; and a particulate composition is provided. The particulate composition includes particles of an inorganic material; and a copolymer of a hydrophilic monomer and a hydrophobic monomer associated with the inorganic particles. The particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In an aspect of this paint embodiment, a moisture pick-up of the composition is 1.0 wt % or less when exposed to 98% relative humidity for 24 hours at 23° C.

Further modification of hydrophobic monomer/hydrophilic monomer ratio, molecular weight, particle size and distribution and surface treatment may be conducted to obtain significant improvement in compatibility with the semi-gloss paint components and paint performance as previously described. Again, the significant increase in moisture loss and low moisture uptake obtained with the inorganic particulate material described in the embodiments may provide significant benefit to durability of the semi-gloss paint. The opportunity to enhance such performance by modification of the inorganic particulate filler according to the embodiments described provides significant advantages to the semi-gloss paint formulation.

According to aspects of this embodiment, the inorganic particulate material employed as filler in the semi-gloss paint may be at least one alkaline earth metal carbonate selected from the group consisting of a carbonate of calcium, a carbonate of magnesium, a carbonate of barium and a carbonate of strontium.

In another embodiment a latex paint composition containing water; a glycol solvent; and a particulate composition is provided. The particulate composition contains particles of an inorganic material; and a copolymer of a hydrophilic monomer and a hydrophobic monomer associated with the inorganic particles. The particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In an aspect of this latex paint embodiment a moisture pick-up of the particulate composition is 1.0 wt % or less when exposed to 98% relative humidity for 24 hours at 23° C.

Further modification of hydrophobic monomer/hydrophilic monomer ratio, molecular weight, particle size and distribution and surface treatment may be conducted to obtain significant improvement in compatibility with the latex paint components and paint performance as previously described. Again, the significant increase in moisture loss and low moisture uptake obtained with the inorganic particulate material described in the embodiments may provide significant benefit to drying rate and durability of the latex paint. The opportunity to enhance such performance by modification of the inorganic particulate filler according to the embodiments described provides significant advantages to the semi-gloss paint formulation.

According to aspects of this embodiment, the inorganic particulate material employed as filler in the semi-gloss paint may be at least one alkaline earth metal carbonate selected from the group consisting of a carbonate of calcium, a carbonate of magnesium, a carbonate of barium and a carbonate of strontium.

In another embodiment, a paper composition containing bleached Kraft pulp; a sizing agent; and a particulate composition is provided. The particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

In an aspect of this embodiment a moisture pick-up of the particulate composition is 1.0 wt % or less when exposed to 98% relative humidity for 24 hours at 23° C.

Further modification of hydrophobic monomer/hydrophilic monomer ratio, molecular weight, particle size and distribution and surface treatment may be conducted to obtain significant improvement in compatibility with the paper components and performance as previously described. Again, the significant increase in moisture loss and low moisture uptake obtained with the inorganic particulate material described in the embodiments may provide significant benefit to drying rate and durability of the paper. The opportunity to enhance such performance by modification of the inorganic particulate filler according to the embodiments described may provide significant advantages to the paper formulation and properties.

According to aspects of this embodiment, the inorganic particulate material employed as filler in the semi-gloss paint may be at least one alkaline earth metal carbonate selected from the group consisting of a carbonate of calcium, a carbonate of magnesium, a carbonate of barium and a carbonate of strontium.

Depending on desired properties, embodiments consistent with this disclosure may include inorganic particles having a BET surface area less than 8 $m^2/g$. Inorganic particles with a BET surface area in the range between 2.5 and 6 $m^2/g$, for example, may provide benefits for breathable films or coatings, as well as other applications. It may be desirable to make, for example, aqueous coating compositions, polymer films, microporous films, inks, offset inks, paints (including semi-gloss and latex paints), polymeric filled articles, or other embodiments that include inorganic particles with a BET surface area between 2.5 and 6 $m^2/g$. The inorganic particulates in these embodiments may also have a Hegman value of 75 microns or less. And compositions including the inorganic particulates may have rates of water loss upon drying from a moisture level greater than 2% wt % that are at least 30% greater than a composition having a corresponding content of a polyacrylate polymer associated with the particles.

Thus, as described heretofore, the specific exemplary embodiments include:

Embodiment 1. A particulate composition, comprising: particles of an inorganic material; and a copolymer of a hydrophilic monomer and a hydrophobic monomer associated with the inorganic particles;

wherein the particulate composition satisfies at least one of the following properties:

a BET surface area of the inorganic particles is greater than 8 $m^2/g$, a Hegman value of the inorganic particles is 75 microns or less, and a rate of water loss from the composition upon drying from a moisture level greater than 2% wt % is at least 30% greater than a composition having a corresponding content of a polyacrylate polymer associated with the particles.

Embodiment 2. The particulate composition of Embodiment 1, wherein a moisture pick-up of the particulate composition is 1.0 wt % or less when exposed to 98% relative humidity for 24 hours at 23° C.

Embodiment 3. The particulate composition of one of Embodiments 1 or 2, wherein a content of the copolymer is from 0.05 to 10 mass % relative to the mass of the inorganic material.

Embodiment 4. The particulate composition of any one of Embodiments 1 to 3, wherein a mole ratio of the hydrophobic monomer to the hydrophilic monomer is from 10/1 to 1/1.

Embodiment 5. The particulate composition of any one of Embodiments 1 to 4, wherein the hydrophobic monomer comprises at least one side chain having from 3 to 10 carbons.

Embodiment 6. The particulate composition of any one of Embodiments 1 to 5, wherein the hydrophobic monomer is at least one selected from the group consisting of a (meth) acrylate ester, an alkene, a vinyl ester, a vinyl ether, styrene, an alkyl substituted styrene, a vinyl pyrrole, a terpene, an indene and an alkyl substituted (meth)acrylamide.

Embodiment 7. The particulate composition of any one of Embodiments 1 to 6, wherein the hydrophobic monomer is a 1-alkene.

Embodiment 8. The particulate composition of Embodiment 7, wherein the 1-alkene is at least one selected from the group consisting of 1-pentene, 1-hexene, 1-heptene, 1-octene, isobutylene and di-isobutylene.

Embodiment 9. The particulate composition of any one of Embodiments 1 to 8, wherein the hydrophilic monomer comprises a functionality selected from the group consisting of carboxylate, carboxylic acid anhydride, sulfonate and phosphonate.

Embodiment 10. The particulate composition of any one of Embodiments 1 to 9, wherein the hydrophilic monomer comprises a carboxylate group or a carboxylic acid anhydride.

Embodiment 11. The particulate composition of any one of Embodiments 1 to 10, wherein the hydrophilic monomer, is selected from the group consisting of acrylic acid, methacrylic acid, angelic acid, itaconic acid, crotonic acid, isocrotonic acid, fumaric acid, maleic acid, maleic anhydride, glutaconic acid, glutaconic anhydride, aconitic acid and mesaconic acid.

Embodiment 12. The particulate composition of any one of Embodiments 1 to 10, wherein the hydrophilic monomer comprises a carboxylate group and the carboxylate group is of a salt comprising at least one of a sodium ion, a potassium ion, an ammonium ion, a calcium ion and a magnesium ion.

Embodiment 13. The particulate composition of Embodiment 12, wherein from 30 to 100% of the carboxylate groups are in a salt form.

Embodiment 14. The particulate composition of any one of Embodiments 1 to 13 wherein an average molecular weight of the copolymer is from 5,000 to 40,000 g/mol.

Embodiment 15. The particulate composition of any one of Embodiments 1 to 14, wherein the inorganic material is an alkaline earth metal carbonate.

Embodiment 16. The particulate composition of Embodiment 15, wherein the alkaline earth metal carbonate comprises at least one selected from the group consisting of a carbonate of calcium, a carbonate of magnesium, a carbonate of barium and a carbonate of strontium.

Embodiment 17. The particulate composition of any one of Embodiments 1 to 16, wherein the inorganic particles are further modified with a surface treatment agent selected from the group consisting of caproic acid, 2-ethylhexanoic acid, caprylic acid, neodecanoic acid, capric acid, valeric acid, lauric acid, myristic acid, palmitic acid, stearic acid, behenic acid, lignoceric acid, tall oil fatty acid, napthenic acid, montanic acid, coronaric acid, linoleic acid, linolenic acid, 4,7,10,13,16,19-docosahexaenoic acid, 5,8,11,14,17-eicosapentaenoic acid, hexanoic acid, heptanoic acid, octanoic acid, nonanoic acid, and isononanoic acid.

Embodiment 18. The particulate composition of any one of Embodiments 1 to 11 or 13 to 17, wherein the hydrophilic monomer is maleic anhydride and/or maleic acid and the hydrophobic monomer is diisobutylene.

Embodiment 19. A method to manufacture an inorganic material composition, comprising:
adding an effective amount of a copolymer of a hydrophilic monomer and a hydrophobic monomer to the inorganic material to obtain a mixture;
grinding the inorganic material copolymer mixture to obtain a ground particulate material
wherein the particulate composition satisfies at least one of the following properties:
a BET surface area of the inorganic particles is greater than 8 m$^2$/g.
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 20. The method of Embodiment 19, wherein an effective amount of the copolymer is from 0.01 to 22 mass % relative to the mass of the inorganic material.

Embodiment 21. The method of one of Embodiments 19 or 20, wherein a mole ratio of the hydrophobic monomer to the hydrophilic monomer is from 10/1 to 1/1.

Embodiment 22. The method of any one of Embodiments 19 to 21, wherein the hydrophobic monomer comprises at least one hydrocarbon group having from 3 to 10 carbons.

Embodiment 23. The method of any one of Embodiments 19 to 22, wherein the hydrophobic monomer is at least one selected from the group consisting of a (meth)acrylate ester, an alkene, a vinyl ester, a vinyl ether, styrene, an alkyl substituted styrene, a vinyl pyrrole, a terpene, an indene and an alkyl substituted (meth)acrylamide.

Embodiment 24. The method of any one of Embodiments 19 to 23, wherein the hydrophobic monomer is a 1-alkene.

Embodiment 25. The method of Embodiment 24, wherein the 1-alkene is at least one selected from the group consisting of 1-pentene, 1-hexene, 1-heptene, 1-octene and di-isobutylene.

Embodiment 26. The method of any one of Embodiments 19 to 25, wherein the hydrophilic monomer comprises a functionality selected from the group consisting of a carboxylate, a carboxylic acid anhydride, a sulfonate and a phosphonate.

Embodiment 27. The method of any one of Embodiments 19 to 26, wherein the hydrophilic monomer comprises a carboxylate group or a carboxylic acid anhydride.

Embodiment 28. The method of any one of Embodiments 19 to 27, wherein the hydrophilic monomer comprises a carboxylate group and the carboxylate group comprises a salt form comprising a sodium ion, an ammonium ion or a magnesium ion.

Embodiment 29. The method of Embodiment 28, wherein from 30 to 100% of the carboxylate groups are in a salt form.

Embodiment 30. The method of any one of Embodiments 19 to 27, wherein the hydrophilic monomer is selected from the group consisting of acrylic acid, methacrylic acid, angelic acid, itaconic acid, crotonic acid, isocrotonic acid, fumaric acid, maleic acid, maleic anhydride, aconitic acid and mesaconic acid.

Embodiment 31. The method of any one of Embodiments 19 to 30, wherein an average molecular weight of the copolymer is from 5,000 to 40,000 g/mol.

Embodiment 32. The method of any one of Embodiments 19 to 31, wherein the inorganic material is an alkaline earth metal carbonate.

Embodiment 33. The method of Embodiment 32, wherein the alkaline earth metal carbonate comprises at least one selected from the group consisting of a carbonate of calcium, a carbonate of magnesium, a carbonate of barium and a carbonate of strontium.

Embodiment 34. The method of any one of Embodiments 19 to 33, further comprising:
applying, a surface treatment agent to the surface of the particulate inorganic material, wherein the surface treatment agent comprises one selected from the group consisting of caproic acid, 2-ethylhexanoic acid, caprylic acid, neodecanoic acid, capric acid, valeric acid, laurie acid, myristic acid, palmitic acid, stearic acid, behenic acid, lignoceric acid, tall oil fatty acid, napthenic acid, montanic acid, coronaric acid, linoleic acid, linolenic acid, 4,7,10,13,16,19-docosahexaenoic acid, 5,8,11,14,17-eicosapentaenoic acid, hexanoic acid, heptanoic acid, octanoic acid, nonanoic acid, and isononanoic acid.

Embodiment 35. A filled polymeric article, comprising:
a polymer; and
a filler of a particulate composition comprising:
particles of an inorganic material; and
a copolymer of a hydrophilic monomer and a hydrophobic monomer associated with the inorganic particles;
wherein the particulate composition satisfies at least one of the following properties:
a BET surface area of the inorganic particles is greater than 8 m$^2$/g,
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 36. The filled polymeric article of Embodiment 35, wherein a moisture pick-up of the particulate composition is 1.0 wt % or less when exposed to 98% relative humidity for 24 hours at 23° C.

Embodiment 37. The filled polymeric article of one of Embodiments 35 or 36, wherein a mole ratio of the hydrophobic monomer to the hydrophilic monomer is from 10/1 to 1/1.

Embodiment 38. The filled polymeric article of any one of Embodiments 35 to wherein the polymer is selected from the group consisting of a thermoplastic polymer, an isotropic semi-crystalline polymer, a semi-crystalline polymer, an isotropic polymer and a liquid crystal polymer, and the mole ratio of the hydrophobic monomer to the hydrophilic monomer is selected to maximize compatibility of the polymer and the filler.

Embodiment 39. The filled polymeric article of any one of Embodiments 35 to 38, wherein the polymer is a thermoplastic polymer selected from the group consisting of a polyolefin, polyvinylchloride and a polystyrene.

Embodiment 40. The filled polymeric article of any one of Embodiments 35 to 39, wherein the polymeric article is a fiber, a film, an extrudate or a molded object.

Embodiment 41. The filled polymeric article of any one of Embodiments 35 to 40, wherein the inorganic material is an alkaline earth metal carbonate.

Embodiment 42. The filled polymeric article of claim 41, wherein the alkaline earth metal carbonate comprises at least one selected From the group consisting of a carbonate of calcium, a carbonate of magnesium, a carbonate of barium and a carbonate of strontium.

Embodiment 43. A coating composition comprising:
water;
a binder; and:
a particulate composition, comprising:
particles of an inorganic material; and
a copolymer of a hydrophilic monomer and a hydrophobic monomer associated with the inorganic particles;
wherein the particulate composition satisfies at least one of the following properties:
a BET surface area of the inorganic particles is greater than 8 $m^2/g$,
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 44. The coating composition of Embodiment 43, wherein a moisture pick-up of the particulate composition is 1.0 wt % or less when exposed to 98% relative humidity for 24 hours at 23° C.

Embodiment 45. The coating composition of one of Embodiments 43 or 44, wherein a mole ratio of the hydrophobic monomer to the hydrophilic monomer is from 10/1 to 1/1.

Embodiment 46. The coating composition of any one of Embodiments 43 to 45, wherein the inorganic material is an alkaline earth metal carbonate.

Embodiment 47. The coating composition of Embodiment 46, wherein the alkaline earth metal carbonate comprises at least one selected from the group consisting of a carbonate of calcium, a carbonate of magnesium, a carbonate of barium and a carbonate of strontium.

Embodiment 48. A substrate having at least one surface coated with the coating composition of any one of Embodiments 43 to 47; wherein the substrate is one selected from the group consisting of paper, cardboard, containerboard, plastic, cellophane, textile, wood, glass, metal and concrete.

Embodiment 49. A method to prepare a porous polymer film, comprising:
preparing a composition of a thermoplastic polymer and an inorganic particulate composition;
molding a film with the composition;
wherein
the inorganic particulate composition comprises:
particles of an inorganic material; and
a copolymer of a hydrophilic monomer and a hydrophobic monomer associated with the inorganic particles; and
wherein the particulate composition satisfies at least one of the following properties:
a BET surface area of the inorganic particles is greater than 8 $m^2/g$,
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 50. The method of Embodiment 49, wherein a moisture pick-up of the particulate composition is 1.0 wt % or less when exposed to 98% relative humidity for 24 hours at 23° C.

Embodiment 51. The method of one of Embodiments 49 or 50, wherein a note ratio of the hydrophobic monomer to the hydrophilic monomer is from 10/1 to 1/1.

Embodiment 52. The method of any one of Embodiments 49 to 51, wherein a mole ratio of the hydrophobic monomer to the hydrophilic monomer is selected to maximize compatibility of the inorganic particles with the thermoplastic polymer.

Embodiment 53. A microporous film, comprising:
at least one of polyethylene and polypropylene; and
an inorganic filler, comprising:
particles of an inorganic material; and
a copolymer of a hydrophilic monomer and a hydrophobic monomer associated with the inorganic particles;
wherein the particulate composition satisfies at least one of the following properties:
a BET surface area of the inorganic particles is greater than 8 $m^2/g$,
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 54. The microporous film of Embodiment 53, wherein a moisture pick-up of the particulate composition is 1.0 wt % or less when exposed to 98% relative humidity for 24 hours at 23° C.

Embodiment 55. The microporous film of one of Embodiments 53 or 54, wherein a mole ratio of the hydrophobic monomer to the hydrophilic monomer is from 10/1 to 1/1.

Embodiment 56. The microporous film of any one of Embodiments 53 to 55, wherein a mole ratio of the hydrophobic monomer to the hydrophilic monomer is selected to maximize compatibility of the inorganic particles with the thermoplastic polymer.

Embodiment 57. A microporous composite, comprising:
a woven or nonwoven fabric; and
the microporous film of claim 53.

Embodiment 58. An ink, comprising:
at least one of a polymeric resin or natural resin;
a hydrocarbon solvent;
Optionally, an alkyd resin; and
at least one of a colorant and a pigment; and
an inorganic particulate composition, comprising:
particles of an inorganic material, and
a copolymer of a hydrophilic monomer and a hydrophobic monomer associated with the inorganic particles;
wherein the particulate composition satisfies at least one of the following properties:
a BET surface area of the inorganic particles is greater than 8 m$^2$/g,
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 59. The ink of Embodiment 58, wherein a moisture pick-up of the particulate composition is 1.0 wt % or less when exposed to 98% relative humidity for 24 hours at 23° C.

Embodiment 60. An offset ink composition, comprising:
a rosin-ester resin;
a vegetable drying oil;
a hydrocarbon solvent; and
a particulate composition, comprising:
particles of an inorganic material; and
a copolymer of a hydrophilic monomer and a hydrophobic monomer associated with the inorganic particles;
wherein the particulate composition satisfies at least one of the following properties:
a BET surface area of the inorganic particles is greater than 8 m$^2$/g,
a Hegman value of the inorganic particles is 75 microns or less, and
a rate of water loss from the composition upon drying from a moisture level greater than 2% is at least 30% greater than a composition having a corresponding content of a polyacrylate polymer associated with the particles.

Embodiment 61. The offset ink composition of Embodiment 60, wherein a moisture pick-up of the particulate composition is 1.0 wt % or less when exposed to 98% relative humidity for 24 hours at 23° C.

Embodiment 62. A semi-gloss paint composition, comprising:
an alkyd resin;
mineral spirits;
a pigment; and
a particulate composition, comprising:
particles of an inorganic material; and
a copolymer of a hydrophilic monomer and a hydrophobic monomer associated with the inorganic particles;
wherein the particulate composition satisfies at least one of the following properties:
a BET surface area of the inorganic particles is greater than 8 m$^2$/g,
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 63. The semi-gloss paint composition of Embodiment 62, wherein a moisture pick-up of the particulate composition is 1.0 wt % or less when exposed to 98% relative humidity for 24 hours at 23° C.

Embodiment 64. A latex paint composition, comprising
water;
a glycol solvent; and
a particulate composition, comprising:
particles of art inorganic material; and
a copolymer of a hydrophilic monomer and a hydrophobic monomer associated with the inorganic particles;
wherein the particulate composition satisfies at least one of the following, properties:
a BET surface area of the inorganic particles is greater than 8 m$^2$/g,
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 65. The latex paint composition of Embodiment 64, wherein a moisture pick-up of the particulate composition is 1.0 wt % or less when exposed to 98% relative humidity for 24 hours at 23° C.

Embodiment 66. A paper composition, comprising:
a bleached Kraft pulp;
a sizing agent; and
a particulate composition, comprising:
particles of an inorganic material; and
a copolymer of a hydrophilic monomer and a hydrophobic monomer associated with the inorganic particles;
wherein the particulate composition satisfies at least one of the following properties:
a BET surface area of the inorganic particles is greater than 8 m$^2$/g,
a Hegman value of the inorganic particles is 75 microns or less, and
a rate of water loss from the composition upon drying from a moisture level greater than 2% wt % is at least 30% greater than a composition having a corresponding content of a polyacrylate polymer associated with the particles.

Embodiment 67. The paper composition of Embodiment 66, wherein a moisture pick-up of the particulate composition is 1.0 wt % or less when exposed to 98% relative humidity for 24 hours at 23° C.

Embodiment 68. The particulate composition of any one of Embodiments 1-4 or 14-17, wherein the copolymer comprises a nonionic phosphate ester.

Embodiment 69. The method of any one of Embodiments 19-21 or 31-34, wherein the copolymer comprises a nonionic phosphate ester.

Embodiment 70. The filled polymeric article of any one of Embodiments 35-42, wherein the copolymer comprises a nonionic phosphate ester.

Embodiment 71. The coating composition of any one of Embodiments 43-47, wherein the copolymer comprises a nonionic phosphate ester.

Embodiment 72. The substrate of Embodiment 48, wherein the copolymer comprises a nonionic phosphate ester.

Embodiment 73. The method of any one of Embodiments 49-52, wherein the copolymer comprises a nonionic phosphate ester.

Embodiment 74. The microporous film of any one of Embodiments 53-56, wherein the copolymer comprises a nonionic phosphate ester.

Embodiment 75. The microporous composite of Embodiment 57, wherein the copolymer comprises a nonionic phosphate ester.

Embodiment 76. The ink of any one of Embodiments 58 or 59, wherein the copolymer comprises a nonionic phosphate ester.

Embodiment 77. The offset ink of any one of Embodiments 60 or 61, wherein the copolymer comprises a nonionic phosphate ester.

Embodiment 78. The semi-gloss paint composition of any one of Embodiments 62 or 63, wherein the copolymer comprises a nonionic phosphate ester.

Embodiment 79. The latex paint composition of any one of Embodiments 64 or 65, wherein the copolymer comprises a nonionic phosphate ester.

Embodiment 80. The paper composition of any one of Embodiments 66 or 67, wherein the copolymer comprises a nonionic phosphate ester.

Embodiment 81. The particulate composition of any one of Embodiments 1-14, 17-18, or 68, wherein the inorganic material comprises one or more materials selected from the group consisting of:
an alkaline earth metal carbonate;
a hydrous kaolinite clay;
an anhydrous kaolinite clay;
a talc, mica, perlite, bentonite, feldspar, wollastonite, diatomaceous earth, alumina, magnesium hydroxide, or aluminium trihydrate; and
combinations thereof.

Embodiment 82. The method of any one of Embodiments 19-31, 34, or 69, wherein the inorganic material comprises one or more materials selected from the group consisting of:
an alkaline earth metal carbonate;
a hydrous kaolinite clay;
an anhydrous kaolinite clay;
a talc, mica, perlite, bentonite, feldspar, wollastonite, diatomaceous earth, alumina, magnesium hydroxide, or aluminium trihydrate; and
combinations thereof.

Embodiment 83. The filled polymeric article of any one of Embodiments 35-40 or 70, wherein the inorganic material comprises one or more materials selected from the group consisting of:
an alkaline earth metal carbonate;
a hydrous kaolinite clay;
an anhydrous kaolinite clay;
a talc, mica, perlite, bentonite, feldspar, wollastonite, diatomaceous earth, alumina, magnesium hydroxide, or aluminium trihydrate; and
combinations thereof.

Embodiment 84. The coating composition of any one of Embodiments 43-45 or 71, wherein the inorganic material comprises one or more materials selected from the group consisting of:
an alkaline earth metal carbonate;
a hydrous kaolinite clay;
an anhydrous kaolinite clay;
a talc, mica, perlite, bentonite feldspar, wollastonite, diatomaceous earth, alumina, magnesium hydroxide, or aluminium trihydrate; and
combinations thereof.

Embodiment 85. The substrate of any one of Embodiments 48 or 72, wherein the inorganic material comprises one or more materials selected from the group consisting of:
an alkaline earth metal carbonate;
a hydrous kaolinite clay;
an anhydrous kaolinite clay;
a talc, mica, perlite, bentonite, feldspar, wollastonite, diatomaceous earth, alumina, magnesium hydroxide, or aluminium trihydrate; and
combinations thereof.

Embodiment 86. The method of any one of Embodiments 49-52 or 73, wherein the inorganic material comprises one or more materials selected from the group consisting of:
an alkaline earth metal carbonate;
a hydrous kaolinite clay;
an anhydrous kaolinite clay;
a talc, mica, perlite, bentonite, feldspar, wollastonite, diatomaceous earth, alumina, magnesium hydroxide, or aluminium trihydrate; and
combinations thereof.

Embodiment 87. The microporous film of any one of Embodiments 53-56 or 74, wherein the inorganic material comprises one or more materials selected from the group consisting of:
an alkaline earth metal carbonate;
a hydrous kaolinite clay;
an anhydrous kaolinite clay;
a talc, mica, perlite, bentonite, feldspar, wollastonite, diatomaceous earth, alumina, magnesium hydroxide, or aluminium trihydrate; and
combinations thereof.

Embodiment 88. The microporous composite of any one of Embodiments 57 or 75, wherein the inorganic material comprises one or more materials selected from the group consisting of:
an alkaline earth metal carbonate;
a hydrous kaolinite clay;
an anhydrous kaolinite clay;
a talc, mica, perlite, bentonite, feldspar, wollastonite, diatomaceous earth, alumina, magnesium hydroxide, or aluminium trihydrate; and
combinations thereof.

Embodiment 89. The ink of any one of Embodiments 58, 59, or 76, wherein the inorganic material comprises one or more materials selected from the group consisting of an alkaline earth metal carbonate;
a hydrous kaolinite clay;
an anhydrous kaolinite clay;
a talc, mica, perlite, bentonite, feldspar, wollastonite, diatomaceous earth, magnesium hydroxide, or aluminium trihydrate; and
combinations thereof.

Embodiment 90. The offset ink of any one of Embodiments 60, 61, or 77, wherein the inorganic material comprises one or more materials selected from the group consisting of;
an alkaline earth metal carbonate;
a hydrous kaolinite clay;
an anhydrous kaolinite clay;
a talc, mica, perlite, bentonite, feldspar, wollastonite, diatomaceous earth, alumina, magnesium hydroxide, or aluminium trihydrate; and
combinations thereof.

Embodiment 91. The semi-gloss paint composition of any one of Embodiments 62, 63, or 78, wherein the inorganic material comprises one or more materials selected from the group consisting of:
an alkaline earth metal carbonate;
a hydrous kaolinite clay;
an anhydrous kaolinite clay;

a talc, mica, perlite, bentonite, feldspar, wollastonite, diatomaceous earth, alumina, magnesium hydroxide, or aluminium trihydrate; and combinations thereof.

Embodiment 92. The latex paint composition of any one of Embodiments 64, 65, or 79, wherein the inorganic material comprises one or more materials selected from the group consisting of:

an alkaline earth metal carbonate;

a hydrous kaolinite clay;

air anhydrous kaolinite clay;

a talc, mica, perlite, bentonite, feldspar, wollastonite, diatomaceous earth, alumina, magnesium hydroxide, or aluminium trihydrate; and combinations thereof.

Embodiment 93. The paper composition of any one of Embodiments 66, 67, or 80, wherein the inorganic material comprises one or more materials selected from the group consisting of:

an alkaline earth metal carbonate;

a hydrous kaolinite clay;

an anhydrous kaolinite clay;

a talc, mica, perlite, bentonite, feldspar, wollastonite, diatomaceous earth, alumina, magnesium hydroxide, or aluminium trihydrate; and combinations thereof.

Embodiment 94. The particulate composition of any one of Embodiments 1-18 or 68, wherein a BET surface area of the inorganic particles is between 2.5 $m^2/g$ and 6 $m^2/g$.

Embodiment 95. The method of any one of Embodiments 19-34 or 69, wherein a BET surface area of the inorganic particles is between 2.5 $m^2/g$ and 6 $m^2/g$.

Embodiment 96. The filled polymeric article of any one of Embodiments 35-42 or 70, wherein a BET surface area of the inorganic particles is between 2.5 $m^2/g$ and 6 $m^2/g$.

Embodiment 97. The coating composition of any one of Embodiments 43-47 or 71, wherein a BET surface area of the inorganic particles is between 2.5 $m^2/g$ and 6 $m^2/g$.

Embodiment 98. The substrate of Embodiment 48 or 72, wherein a BET surface area of the inorganic particles is between 2.5 $m^2/g$ and 6 $m^2/g$.

Embodiment 99. The method of any one of Embodiments 49-52 or 73, wherein a BET surface area of the inorganic particles is between 2.5 $m^2/g$ and 6 $m^2/g$.

Embodiment 100. The microporous film of any one of Embodiments 53-56 or 74, wherein a BET surface area of the inorganic particles is between 2.5 $m^2/g$ and 6 $m^2/g$.

Embodiment 101. The microporous composite of any one of Embodiments 57 or 75, wherein a BET surface area of the inorganic particles is between 2.5 $m^2/g$ and 6 $m^2/g$.

Embodiment 102. The ink of any one of Embodiments 58, 59, or 76 wherein a BET surface area of the inorganic particles is between 2.5 $m^2/g$ and 6 $m^2/g$.

Embodiment 103. The offset ink of any one of Embodiments 60, 61, or 77, wherein a BET surface area of the inorganic particles is between 2.5 $m^2/g$ and 6 $m^2/g$.

Embodiment 104. The semi-gloss paint composition of any one of Embodiments 62, 63, or 78, wherein a BET surface area of the inorganic particles is between 2.5 $m^2/g$ and 6 $m^2/g$.

Embodiment 105. The latex paint composition of any one of Embodiments 64, 65, or 79, wherein a BET surface area of the inorganic particles is between 2.5 $m^2/g$ and 6 $m^2/g$.

Examples

Measurement of Hegman Number

About 150 g of powder was mixed into a dispersion mixture (12 g of white spirit, 42.5 g of alkyd resin, and 1.5 g of calcium drier) using a mixer at ~5000 rpm for 15 minute. A 5 ml of aliquot was mixed with 10 ml of the dispersion mixture and homogenised by stirring. The homogenised sample was drawn on Hegman gauge. The Hegman number for dispersion or paste is the depth of grove in the Hegman Gauge at which dicrete particles or agglomerates become visible when the dispersion or paste is scrapped along the groove with a straight edge.

Grinding Experiments

About 750 g of coarse (10 μm) mineral particles are mixed with ~1500 g of oven dry carbolite media (16/20) mesh in a sand grinder (3 hp, 1400 rpm). The desired amount of dispersant is separately premixed with water and added to the sand grinder. After running for 5 minutes the energy input was recorded and was maintained at constant level. After grinding for a prescribed time, the grinder pot was removed and the contents were poured through a 30 mesh screen. The resultant screened dispersion was collected for further analysis.

Drying Experiments

The loss on drying was measured using a highly sensitive heated balance. About 10 g of each calcium carbonate powder grinding with copolymer of maleic anhydride and diisobutylene and conventional sodium polyacrylate were dried at 110° C. for 24 hours and then hydrated for 24 hours at 98% relative humidity. The hydrated powders were placed on the calibrated balance and mass loss at every 30 seconds was noted.

FIG. 1 shows drying loss with time for a sample of calcium carbonate treated with a copolymer of maleic anhydride according to an embodiment of this application (Sample B) in comparison to a calcium carbonate sample treated with conventional sodium polyacrylate (Sample A). As shown the sample according to the embodiments of the following Claims has a lower equilibrium moisture content and the rate of moisture loss is higher.

Experiment 1

Calcium carbonate was ground and treated with a commercial grade of sodium polyacrylate, ground and treated with a copolymer of maleic anhydride and diisobutylene (copolymer) and ground in the absence of dispersant. Hegman numbers standardized to the sodium polyacrylate sample as "1" were determined as follows:

| Sample | Hegman (relative value) |
| --- | --- |
| Commercial sodium polyacrylate | 1 |
| No dispersant | 0.75 |
| Copolymer | 0.25 |

Experiment 2

Calcium carbonate was ground without dispersant to the Hegman numbers shown below. In comparison, two samples of calcium carbonate were ground and treated with 0.5 wt % and 1.0 wt % based on the weight of the calcium carbonate of a copolymer of maleic anhydride and diisobutylene (copolymer). Hegman numbers, BET surface area ($m^2/g$) and d50 values for each sample are listed below.

| Sample | Hegman (microns) | BET | d50 |
|---|---|---|---|
| no dispersant | 78 | 10.1 | 0.77 |
| no dispersant | 80 | 9.5 | 0.60 |
| 0.5% copolymer | 35 | 9.9 | 0.60 |
| 1.0% copolymer | 60 | 10.8 | 0.59 |

Experiment 3

Figure 2:
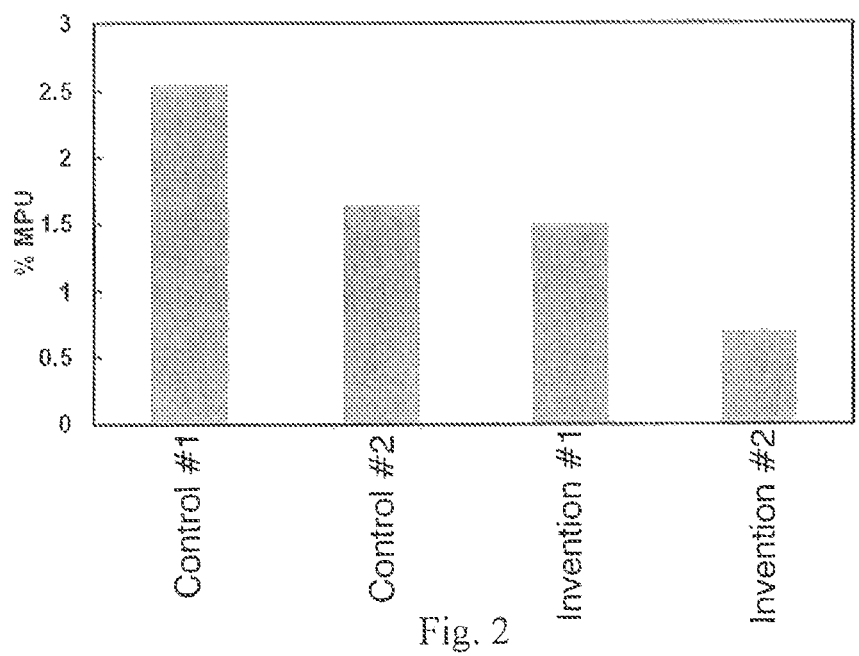
FIG. 2 shows moisture pick-up of the samples prepared in Experiment 3.

Ground calcium carbonate (GCC) was ground and treated with a standard polyacrylic acid dispersant (sample identified as "control #1"). A comparative sample of the GCC was ground and treated with a same wt % of a copolymer of maleic anhydride and diisobutylene (sample identified as invention #1). Both samples were further treated with stearic acid (control #2 and invention #2). The moisture pick-up of each sample after 24 hours at 98% relative humidity is shown in FIG. 2.

Experiment 4

Samples aground calcium carbonate (GCC) and precipitated calcium carbonate (PCC) were dispersed using (i) a standard sodium polyacrylate (NaPa) dispersant and (ii) a copolymer of maleic anhydride and diisobutylene (copolymer). These samples, as well as a sample comprising dry-ground PCC, were added to an organic resin to form offset ink solutions. Fount solution was titrated into each of the five ink solutions to excess. The turbidity of the excess fount solution was then measured using a UV-visible spectrometer (at a wavelength 460 nm).

| Sample | Measured Turbidity |
|---|---|
| PCC powder no dispersant | 0 |
| PCC dispersed with NaPa | 6 |
| PCC dispersed with Compolyer | 0.09 |
| GCC ground with NaPa | 6 |
| GCC ground with Copolymer | 0.19 |

Samples prepared with the copolymer dispersant exhibited very low turbidity indicating low migration of mineral from the oil to the water phase, while samples prepared with NaPa dispersant gave high turbidity (opaque) due to high migration of mineral. The scale of turbidity was from 0 (clear) to 6 (opaque).

Additional advantages and other features of the present disclosure will become apparent to those having ordinary skill in the art upon examination of the foregoing description or may be learned from the practice of the present disclosure. As will be realized, the present disclosure is capable of other and different embodiments, and its several details are capable modifications in various obvious respects, all without departing from the present invention. In this regard, the description herein is to be understood as illustrative in nature, and not as restrictive. Further, the advantages of the present invention may be realized and obtained as particularly pointed out in the appended claims.

We claim:

1. A coating composition comprising:
   water;
   a binder; and
   a particulate composition;
   wherein the particulate composition comprises:
   particles of an inorganic material, wherein (a) a BET surface area of the inorganic particles is greater than 8 $m^2/g$ and (b) a Hegman value of the inorganic particles is 75 microns or less; and
   a copolymer of a hydrophilic monomer and a hydrophobic monomer associated with the particles of the inorganic material;
   wherein a mole ratio of the hydrophobic monomer to the hydrophilic monomer is from 10/1 to 1/1.

2. The coating composition of claim 1, wherein a moisture pick-up of the particulate composition is 1.0 wt % or less when exposed to 98% relative humidity for 24 hours at 23° C.

3. The coating composition of claim 1, wherein the inorganic material is an alkaline earth metal carbonate.

4. The coating composition of claim 3, wherein the alkaline earth metal carbonate comprises a carbonate of calcium, a carbonate of magnesium, a carbonate of barium and a carbonate of strontium.

5. A substrate having at least one surface coated with the coating composition of claim 1; wherein the substrate is selected from paper, cardboard, containerboard, plastic, cellophane, textile, wood, glass, metal and concrete.

6. The coating composition of claim 1, wherein the particulate composition, upon drying from a moisture level greater than 2% wt %, also has a rate of water loss of at least 30% greater than a composition having a corresponding content of a polyacrylate polymer associated with the particles of the inorganic material.

* * * * *